United States Patent
Potter et al.

(10) Patent No.: US 7,222,148 B2
(45) Date of Patent: May 22, 2007

(54) SYSTEM AND METHOD FOR PROVIDING HIGHLY AVAILABLE PROCESSING OF ASYNCHRONOUS SERVICE REQUESTS

(75) Inventors: Tim Potter, Denver, CO (US); Mitch Upton, Highlands Ranch, CO (US); Christa Golding, Littleton, CO (US)

(73) Assignee: BEA Systems, Inc., San Jose, CA (US)

( * ) Notice: Subject to any disclaimer, the term of this patent is extended or adjusted under 35 U.S.C. 154(b) by 444 days.

(21) Appl. No.: 10/293,059

(22) Filed: Nov. 13, 2002

(65) Prior Publication Data
US 2004/0015368 A1    Jan. 22, 2004

Related U.S. Application Data

(60) Provisional application No. 60/377,332, filed on May 2, 2002.

(51) Int. Cl.
G06F 15/16    (2006.01)
(52) U.S. Cl. .................. 709/201; 709/203; 709/217
(58) Field of Classification Search ........ 709/201–203, 709/206–207, 217–219, 226
See application file for complete search history.

(56) References Cited

U.S. PATENT DOCUMENTS

| | | | |
|---|---|---|---|
| 5,283,897 A | 2/1994 | Georgiadis et al. | |
| 5,321,841 A | 6/1994 | East et al. | |
| 5,544,318 A * | 8/1996 | Schmitz et al. | 709/207 |
| 5,748,975 A | 5/1998 | Van De Vanter | |
| 5,801,958 A | 9/1998 | Dangelo et al. | |
| 5,828,847 A | 10/1998 | Gehr et al. | |
| 5,835,769 A | 11/1998 | Jervis et al. | |
| 5,836,014 A | 11/1998 | Faiman, Jr. | |
| 5,862,327 A | 1/1999 | Kwang et al. | |
| 5,892,913 A | 4/1999 | Adiga et al. | |
| 5,933,838 A | 8/1999 | Lomet | |
| 5,950,010 A | 9/1999 | Hesse et al. | |
| 5,951,694 A | 9/1999 | Choquier et al. | |
| 5,961,593 A | 10/1999 | Gabber et al. | |
| 5,966,535 A | 10/1999 | Benedikt et al. | |
| 6,012,094 A | 1/2000 | Leymann et al. | 709/230 |
| 6,021,443 A | 2/2000 | Bracho et al. | |

(Continued)

FOREIGN PATENT DOCUMENTS

EP    1 006 443 A2    6/2000

(Continued)

OTHER PUBLICATIONS

U.S. Appl. No. 10/271,194, filed Oct. 15, 2002, Upton.

(Continued)

*Primary Examiner*—Bharat Barot
(74) *Attorney, Agent, or Firm*—Fliesler Meyer LLP

(57) ABSTRACT

Highly-available processing of an asynchronous request can be accomplished in a single transaction. A distributed request queue receives a service request from a client application or application view client. A service processor is deployed on each node of a cluster containing the distributed request queue. A service processor pulls the service request from the request queue and invokes the service for the request, such as to an enterprise information system. If that service processor fails, another service processor in the cluster can service the request. The service processor receives a service response from the invoked service and forwards the service response to a distributed response queue. The distributed response queue holds the service response until the response is retrieved for the client application.

27 Claims, 2 Drawing Sheets

U.S. PATENT DOCUMENTS

| | | |
|---|---|---|
| 6,023,722 A | 2/2000 | Colyer |
| 6,028,997 A | 2/2000 | Leymann et al. |
| 6,029,000 A | 2/2000 | Woolsey et al. |
| 6,044,217 A | 3/2000 | Brealey et al. |
| 6,061,721 A | 5/2000 | Ismael et al. |
| 6,067,623 A | 5/2000 | Blakley, III et al. |
| 6,070,184 A * | 5/2000 | Blount et al. ............... 709/202 |
| 6,078,943 A | 6/2000 | Yu |
| 6,081,840 A | 6/2000 | Zhao |
| 6,085,030 A | 7/2000 | Whitehead et al. |
| 6,119,143 A | 9/2000 | Dias et al. |
| 6,119,149 A | 9/2000 | Notani |
| 6,128,279 A | 10/2000 | O'Neil et al. |
| 6,131,118 A | 10/2000 | Stupek, Jr. et al. |
| 6,141,686 A | 10/2000 | Jackowski et al. |
| 6,154,738 A | 11/2000 | Call |
| 6,154,769 A | 11/2000 | Cherkasova et al. ........ 709/207 |
| 6,189,044 B1 | 2/2001 | Thomson et al. |
| 6,195,680 B1 | 2/2001 | Goldszmidt et al. |
| 6,222,533 B1 | 4/2001 | Notani et al. |
| 6,226,666 B1 * | 5/2001 | Chang et al. ............... 709/201 |
| 6,226,675 B1 | 5/2001 | Meltzer et al. |
| 6,226,788 B1 | 5/2001 | Schoening et al. |
| 6,230,160 B1 | 5/2001 | Chan et al. |
| 6,230,287 B1 | 5/2001 | Pinard et al. |
| 6,230,309 B1 | 5/2001 | Turner et al. |
| 6,233,607 B1 | 5/2001 | Taylor et al. |
| 6,237,135 B1 | 5/2001 | Timbol |
| 6,253,230 B1 | 6/2001 | Couland et al. |
| 6,269,373 B1 | 7/2001 | Apte et al. |
| 6,282,711 B1 | 8/2001 | Halpern et al. |
| 6,292,830 B1 | 9/2001 | Taylor et al. |
| 6,292,932 B1 | 9/2001 | Baisley et al. |
| 6,317,786 B1 | 11/2001 | Yamane et al. |
| 6,324,681 B1 | 11/2001 | Sebesta et al. |
| 6,330,569 B1 | 12/2001 | Baisley et al. |
| 6,336,122 B1 | 1/2002 | Lee et al. |
| 6,338,064 B1 | 1/2002 | Ault et al. |
| 6,343,265 B1 | 1/2002 | Glebov et al. |
| 6,345,283 B1 | 2/2002 | Anderson |
| 6,348,970 B1 | 2/2002 | Marx |
| 6,349,408 B1 | 2/2002 | Smith |
| 6,353,923 B1 | 3/2002 | Bogel et al. |
| 6,356,906 B1 | 3/2002 | Lippert et al. |
| 6,360,221 B1 | 3/2002 | Gough et al. |
| 6,374,297 B1 | 4/2002 | Wolf et al. |
| 6,377,939 B1 | 4/2002 | Young |
| 6,393,605 B1 | 5/2002 | Loomans |
| 6,408,311 B1 | 6/2002 | Baisley et al. |
| 6,438,594 B1 | 8/2002 | Bowman-Armuah |
| 6,442,565 B1 | 8/2002 | Tyra et al. |
| 6,442,611 B1 | 8/2002 | Navarre et al. ............. 709/227 |
| 6,445,711 B1 * | 9/2002 | Scheel et al. ............... 370/402 |
| 6,463,503 B1 | 10/2002 | Jones et al. |
| 6,515,967 B1 | 2/2003 | Wei et al. |
| 6,535,908 B1 * | 3/2003 | Johnson et al. ............. 709/217 |
| 6,549,949 B1 | 4/2003 | Bowman-Amuah |
| 6,553,425 B1 | 4/2003 | Shah et al. ................. 709/245 |
| 6,560,769 B1 | 5/2003 | Moore et al. |
| 6,594,693 B1 | 7/2003 | Borwankar |
| 6,594,700 B1 | 7/2003 | Graham et al. |
| 6,604,198 B1 | 8/2003 | Beckman et al. |
| 6,622,168 B1 * | 9/2003 | Datta ......................... 709/219 |
| 6,678,518 B2 | 1/2004 | Eerola |
| 6,687,848 B1 | 2/2004 | Najmi |
| 6,697,849 B1 | 2/2004 | Carlson |
| 6,721,747 B2 | 4/2004 | Lipkin |
| 6,732,237 B1 | 5/2004 | Jacobs et al. |
| 6,748,420 B1 | 6/2004 | Quatrano et al. |
| 6,782,416 B2 * | 8/2004 | Cochran et al. ............ 709/217 |
| 6,795,967 B1 | 9/2004 | Evans et al. |
| 6,802,000 B1 | 10/2004 | Greene et al. |
| 6,804,686 B1 | 10/2004 | Stone et al. |
| 6,850,979 B1 | 2/2005 | Saulpaugh et al. |
| 6,857,012 B2 | 2/2005 | Sim et al. |
| 6,859,834 B1 | 2/2005 | Arora et al. |
| 6,889,244 B1 * | 5/2005 | Gaither et al. .............. 709/202 |
| 6,910,041 B2 | 6/2005 | Exton et al. |
| 6,915,519 B2 | 7/2005 | Williamson et al. |
| 6,918,084 B1 | 7/2005 | Slaughter et al. |
| 6,925,482 B2 | 8/2005 | Gopal |
| 6,925,492 B2 | 8/2005 | Shirriff |
| 6,950,825 B2 | 9/2005 | Chang |
| 6,963,914 B1 * | 11/2005 | Breitbart et al. ............ 709/226 |
| 6,970,939 B2 | 11/2005 | Sim |
| 6,976,086 B2 | 12/2005 | Sadeghi et al. |
| 6,983,328 B2 | 1/2006 | Beged-Dov et al. |
| 7,047,287 B2 | 5/2006 | Sim et al. |
| 7,054,858 B2 | 5/2006 | Sutherland |
| 7,058,014 B2 | 6/2006 | Sim |
| 7,058,637 B2 | 6/2006 | Britton et al. |
| 7,117,504 B2 * | 10/2006 | Smith et al. ................. 709/201 |
| 2002/0004848 A1 | 1/2002 | Sudarshan et al. |
| 2002/0010803 A1 | 1/2002 | Oberstein et al. |
| 2002/0016759 A1 | 2/2002 | Marcready et al. |
| 2002/0026630 A1 | 2/2002 | Schmidt et al. |
| 2002/0078365 A1 | 6/2002 | Burnette et al. |
| 2002/0083075 A1 | 6/2002 | Brummel et al. |
| 2002/0083118 A1 | 6/2002 | Sim |
| 2002/0083187 A1 | 6/2002 | Sim et al. |
| 2002/0111820 A1 | 8/2002 | Massey |
| 2002/0120685 A1 | 8/2002 | Srivastava et al. |
| 2002/0120786 A1 | 8/2002 | Sehayek et al. |
| 2002/0133491 A1 | 9/2002 | Sim et al. |
| 2002/0152106 A1 | 10/2002 | Stoxen et al. |
| 2002/0165936 A1 | 11/2002 | Alston et al. |
| 2002/0184145 A1 | 12/2002 | Sijacic et al. |
| 2002/0184610 A1 | 12/2002 | Chong et al. |
| 2002/0194495 A1 | 12/2002 | Gladstone et al. |
| 2002/0198800 A1 | 12/2002 | Shamrakov |
| 2003/0004746 A1 | 1/2003 | Kheirolomoom et al. |
| 2003/0005181 A1 * | 1/2003 | Bau et al. ................... 709/330 |
| 2003/0014439 A1 | 1/2003 | Boughannam |
| 2003/0018665 A1 | 1/2003 | Dovin et al. |
| 2003/0018832 A1 | 1/2003 | Amirisetty et al. |
| 2003/0031176 A1 | 2/2003 | Sim |
| 2003/0033437 A1 | 2/2003 | Fischer et al. |
| 2003/0043191 A1 | 3/2003 | Tinsley et al. |
| 2003/0046266 A1 | 3/2003 | Mullins et al. |
| 2003/0055868 A1 | 3/2003 | Fletcher et al. |
| 2003/0055878 A1 | 3/2003 | Fletcher et al. |
| 2003/0061405 A1 | 3/2003 | Fisher et al. |
| 2003/0074467 A1 | 4/2003 | Oblak et al. |
| 2003/0093402 A1 | 5/2003 | Upton |
| 2003/0093403 A1 | 5/2003 | Upton |
| 2003/0093470 A1 | 5/2003 | Upton |
| 2003/0093471 A1 | 5/2003 | Upton |
| 2003/0097345 A1 | 5/2003 | Upton |
| 2003/0097574 A1 | 5/2003 | Upton |
| 2003/0105884 A1 | 6/2003 | Upton |
| 2003/0110117 A1 | 6/2003 | Saidenberg et al. |
| 2003/0110315 A1 | 6/2003 | Upton |
| 2003/0110446 A1 | 6/2003 | Nemer |
| 2003/0126136 A1 | 7/2003 | Omoigui |
| 2003/0145047 A1 | 7/2003 | Upton |
| 2003/0149791 A1 | 8/2003 | Kane et al. |
| 2003/0167358 A1 | 9/2003 | Marvin et al. |
| 2003/0182452 A1 | 9/2003 | Upton |
| 2003/0196168 A1 | 10/2003 | Hu |
| 2003/0233631 A1 | 12/2003 | Curry |
| 2004/0015368 A1 | 1/2004 | Potter et al. |
| 2004/0068568 A1 | 4/2004 | Griffin |
| 2004/0133660 A1 | 7/2004 | Junghuber et al. |
| 2004/0148336 A1 | 7/2004 | Hubbard et al. |

| | | |
|---|---|---|
| 2004/0204976 A1 | 10/2004 | Oyama et al. |
| 2004/0216086 A1 | 10/2004 | Bau |
| 2004/0225995 A1 | 11/2004 | Marvin et al. |
| 2004/0260715 A1 | 12/2004 | Mongeon et al. |
| 2005/0033663 A1 | 2/2005 | Narin et al. |
| 2005/0223392 A1 | 10/2005 | Cox et al. |

FOREIGN PATENT DOCUMENTS

| | | |
|---|---|---|
| EP | 1 061 445 A2 | 12/2000 |
| WO | WO 01/90884 A2 | 11/2001 |

OTHER PUBLICATIONS

U.S. Appl. No. 10/293,655, filed Nov. 13, 2002, Potter.
U.S. Appl. No. 10/293,656, filed Nov. 13, 2002, Potter.
U.S. Appl. No. 10/293,674, filed Nov. 13, 2002, Potter.
Blake, "Rule-Driven Coordination Agents: A Self-Configurable Agent Architecture for Distributed Control", IEEE, Mar. 2001, pp. 271-277.
Dahalin et al., "Workflow Interoperability Using Extensible Markup Language (XML)", IEEE, Jul. 2002, pp. 513-516.
Duvos et al., An Infrastructure for the Dynamic Distribution of Web Application and Services, Department of Computer Science Boston Universiry, Dec. 2000, pp. 1-22.
Hewlett-Packard, HP Applicaction Server, Technical Guide Version 8-0, HP, Nov. 15, 2001, pp. I-x, 1-234.
Kunisetty, "Workflow Modeling and Simulation Using an Extensible Object-Oriented Knowledge Base Management System", CiteSeer, 1996, pp. 1-60.
Lauer, "Introducing Microsoft DotNet", Jul. 2, 2002, web.archive.org/web/20020702162429/http://www.freebvcode.com/ShowCode.asp?ID=2171.
Mariucci, Enterprise Application Server Development Environments, University of Stuttgart, Oct. 10, 2000, pp. 1-30.
Mohan et al., "ARIES: A Transaction Recovery Method Suporting Fine-Graniarity Locking and Partial Rollbacks Using Write-Ahead Logging", ACM Transaction on Databease Systems, vol. 17, No. 1, Mar. 1992, pp. 94-162.
Paul, Laura Gibbons, "RosettaNet: Teaching business to work together", Oct. 1, 1999. developer.com/xml/article.php/616641.
Richter, J., "Advanced Windows Programming", 1996, Microsoft Press™, pp. 697-699.
Roman et al., The Technical Benefits of EJB and J2EE Technolgoies over COM+ and Windows DNA, Enterprise Edition (J2EE) Technologies, Dec. 1999, pp. 1-24.
Sun Microsystems, Iplanet Application Server 6.0 White Paper, iPlanet E-Commerce Solutions, May 25, 2000, pp. 1-104.
Van Der Aaslt et al., "Verification of XRL: An XML-Based Workflow Language", IEEE, Jul. 2001, pp. 427-432.
Sosnoski, Dennis, "XML and Java Technologies: Data Binding, Part 1: Code Generation Approaches—JAXB and More", IBM, pp. 1-11 (Jan. 2003).
Chen, et al., "eCo Architecture for Electronic Commerce Interoperability", Jun. 29, 1999, CommerceNet.

* cited by examiner

US 7,222,148 B2

SYSTEM AND METHOD FOR PROVIDING HIGHLY AVAILABLE PROCESSING OF ASYNCHRONOUS SERVICE REQUESTS

CLAIM OF PRIORITY

This application claims priority to U.S. Provisional Patent Application No. 60/377,332, filed May 2, 2002, entitled "HIGH AVAILABILITY FOR ASYNCHRONOUS REQUESTS," which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. patent application Ser. No. 10/271,194 entitled "Application View Component for System Integration," by Mitch Upton, filed Oct. 15, 2002.

U.S. patent application Ser. No. 10/293,674 entitled "High Availability Event Topic," by Tim potter et al., filed Nov. 13, 2002.

U.S. patent application Ser. No. 10/293,655 entitled "High Availability Application View Deployment,: by Tim Potter et al., filed Nov. 13, 2002.

U.S. patent application Ser. No. 10/293,656 entitled "High Availability for Event Forwarding," by Tim Potter et al., filed Nov. 13, 2002.

FIELD OF THE INVENTION

The present invention relates to the availability of services such as JMS across a network or in a server cluster.

BACKGROUND

In present application integration (AI) systems, there can be several single points of failure. These single points of failure can include deployment or management facilities, event forwarding, event topics, remote clients, event subscriptions, response listeners, and response queues. Each of these features is tied to a single server within a server cluster. If that single server crashes, the entire AI application can become irreparably damaged and must be rebooted via a server reboot.

Single points of failure such as request and response queue are used for processing asynchronous requests. Current implementations of asynchronous service request processing utilize a single physical request queue and response queue per server instance. In the event of a node failure, all asynchronous requests and responses within a given JMS server, for example, become unavailable until the JMS server is restarted.

BRIEF SUMMARY

Systems and methods in accordance with the present invention can overcome deficiencies in prior art systems by allowing for high-availability processing of asynchronous requests in a single transaction. A distributed request queue can be used to receive and store a service request, such as from a user or client application. A service processor can pull the service request from the request queue and invoke the service for the service request, such as to an enterprise information system. The service processor can receive the service response from the invoked service and forward the service response to a distributed response queue. The distributed response queue can hold the service response until the response is retrieved for the user or client application. An application view client can act on behalf of the user or client application, sending the service request to the distributed request queue and retrieving the service response from the distributed response queue. The application view client can generate failure recovery semantics for the client application in the event of a failure. The application view can also determine whether any service responses are waiting in the distributed response queue for the client application.

These systems and methods can be used in a server cluster. There can be a service processor deployed on every node in the cluster, each of which can listen to a given distributed request queue. This allows a service to be migrated between nodes in the cluster in the event of a node failure.

Other features, aspects, and objects of the invention can be obtained from a review of the specification, the figures, and the claims.

DETAILED DESCRIPTION

Figure 1:
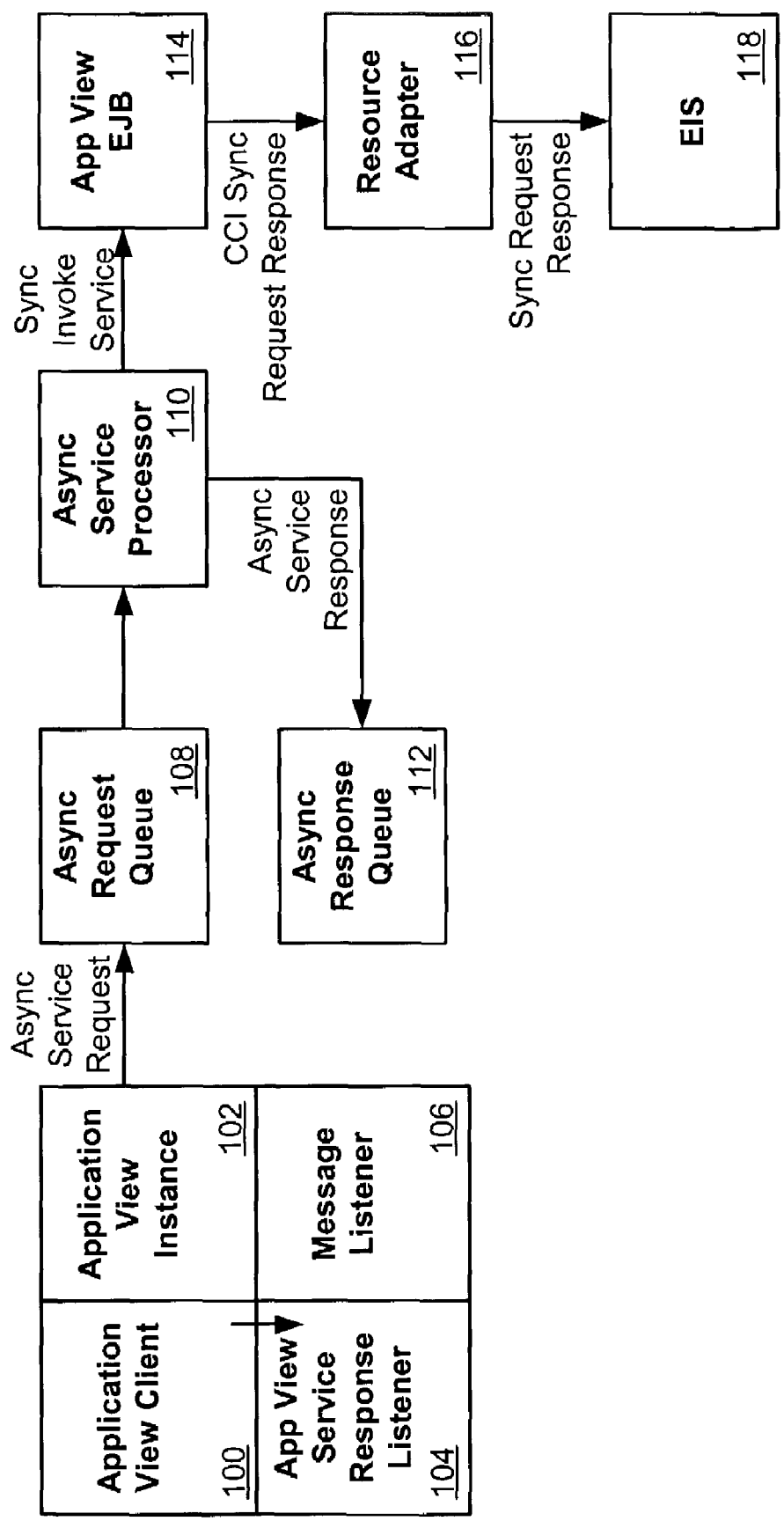
FIG. 1 is a diagram of a system in accordance with one embodiment of the present invention.

A system and method in accordance with one embodiment of the present invention can overcome deficiencies in present asynchronous messaging systems by taking advantage of asynchronous request and response queues, as well as asynchronous request and response processors. A client may wish to invoke a service asynchronously in order to begin and/or continue processing other matters, instead of simply waiting for the response. For example, a long running process such as a batch process run against an SAP system or database can take minutes or even hours. Asynchronous requests can allow a client to send the request and then move on to other business.

The use of server clustering allows an AI component to be used in a scalable and highly available fashion. A highly available component does not have any single points of failure, and can have the ability to migrate services from failed nodes to live nodes in a cluster. Any service offered by the AI component can be targeted to several nodes in a cluster. In the event of a node failure in the cluster, the services located on the failed node can be migrated to another live node in the cluster.

In the event of a crash of a cluster or managed server, the AI application can continue accepting new work. The acceptance of new work can include deploying new and undeploying old application views and connection factories, monitoring of old application views and connection factories, delivering events from adapters, and servicing both synchronous and asynchronoushronous service invocations. An AI application can also support the manual migration of services on the failed node to a live node, such as a singleton message-driven Enterprise JavaBean (MDB) listening on a physical destination managed by a failed JMS server. Application integration can use a singleton MDB if a customer needs ordered event processing, for example. An AI application can notify users in an understandable and/or predictable way that in-flight transactions have been cancelled or rolled-back, and should be retried. Wherever possible, an AI application can retry the transaction after reestablishing connections to make use of resources on another live server.

In the event of an administration (admin) server failure, an AI application can do all the tasks mentioned with respect to a crash of a cluster or managed server. The AI application can also notify users that deployment or undeployment is unavailable while the admin server is unavailable. The AI application can still boot or reboot successfully using the previous domain and/or server configuration.

A system and method in accordance with one embodiment of the present invention allows asynchronous requests and responses to be available within a given JMS server, even in the event of a node failure. Request and response queues, such as ASYNC_REQUEST_QUEUE and ASYNC_RESPONSE_QUEUE, can be deployed as distributed queues in a cluster. A request processor, such as AsyncServiceRequestProcessor, can be packaged as an MDB. Such a system allows the processing of asynchronous requests and responses even if the JMS server that accepted the requests crashes or becomes otherwise unavailable.

In the event that a physical queue fails before an asynchronous service request is received by the appropriate MDB, the request can be unavailable until the physical queue comes back on line. This can hold true for asynchronous service responses. Using a system in accordance with one embodiment of the present invention, an asynchronous service processor MDB can be deployed on a single distributed JMS queue, such as ASYNC_REQUEST_QUEUE. This deployment removes the need to maintain and manage a pool of asynchronous request processor threads. An asynchronous service processor MDB can be last in the deployment order for the AI application, and can be deployed from a JAR file such as "ai-asyncprocessor-ejb.jar."

FIG. 1 shows an example of a high-availability asynchronous service processing system in accordance with one embodiment of the present invention. An application view client 100 has the ability to generate and deal with failure recovery semantics without the user having any knowledge or input. For instance, a client application that sends off a request might crash or otherwise become unavailable at some point before the response is received. When the response is ready to be returned, the response can sit in an asynchronous response queue 112 until the client comes back. When the client 100 is available again, the client will want to receive the response. Since the system is utilizing distributed queues, the client application would need to go out to the server and determine whether there are any responses from previous requests that were sent before the failure. The application view client 100 can take care of this determination behind the scenes, such that the user or client application does not need to do anything to find the response.

The user or client application making the request can register a message listener 106, such that the user or client application can be informed that a message is ready and waiting to be received. An asynchronous service processor 110 can pull a request off the asynchronous request queue 108, invoke the asynchronous service against an Enterprise Information System (EIS) 118, and wait for the response. When the asynchronous service response comes back, the asynchronous service processor 110 can put the response onto the response queue 112. In this embodiment, this processing is accomplished as a single transaction.

The application view client 100 can instantiate an application view instance 102. The client 100 can have the option of supplying a durable client identifier at the time of construction. The durable client identifier can be used as a correlation identifier for asynchronous response messages. The client 100 can invoke an asynchronous service method, such as "invokeServiceAsync", and can pass a request document and response listener 104, such as AsyncServiceResponseListener, to handle the response.

An application view instance 102 can create a service request object, such as AsyncServiceRequest, and can send the object to a request queue 108, such as ASYNC_REQUEST_QUEUE. The service request object can contain the name of the destination to which the response listener is pinned. A service processor MDB 110 can use this information to determine the physical destination to receive the response. If the request object does not contain the name of a response destination, the service processor MBD 110 can use the destination set on the JMS message via a call to a method such as JMSReplyTo( ). If a client only supplies a service response listener 104 to the application view, such as:

invokeServiceAsync(String serviceName, IDocument request, AsyncServiceResponseListener listener);

the application view can establish a JMS queue receiver to the JMS queue bound at a JNDI location provided by an application view Enterprise JavaBean (EJB) method, such as getAsyncResponseQueueJNDIName( ). The application view instance 102 can use QueueReceiver::getQueue( ) to set the ReplyTo destination on the request message.

In a cluster, an asynchronous request queue 108 can be deployed as a distributed JMS queue. Each message can be sent to a single physical queue, and not be forwarded or replicated in any way. As such, the message is only available from the physical queue to which it was sent. If that physical queue becomes unavailable before a given message is received, the message or AsyncServiceRequest can be unavailable until that physical queue comes back on-line. It is not enough to send a message to a distributed queue and expect the message to be received by a receiver of that distributed queue. Since the message is sent to only one physical queue, there must be a queue receiver receiving or listening on that physical queue. Thus, an AI asynchronous service processor MDB can be deployed on all nodes in a cluster.

An asynchronous service processor MDB can receive the message from the queue in a first-in, first-out (FIFO) manner. The service processor can use the asynchronous service request object in a JMS ObjectMessage to determine the qualified name, service name, request document, and response destination of the application view. The asynchronous service processor 110 can use an application view EJB 114 to invoke the service synchronously. The service can be translated into a synchronous CCI-based request and/or response to the resource adapter 116.

When an asynchronous service processor MDB 110 receives the response, the response can be encapsulated into an asynchronous service response object and sent to the response destination provided in the asynchronous service request object. The asynchronous service processor MDB 110 cannot just send the response to the asynchronous response queue 112, the response needs to be sent to a specific physical destination. This specific physical destination, or queue, can have been established by the application view instance 102 running on the client when, for example, an application view EJB method such as getAsyncResponseQueueJNDIName( ) was called.

If the client application fails and a new application view is created with the same durable client identifier, there is a chance that the new application view will be pinned to a different physical JMS queue than the JMS queue that the client was using prior to the failure. Consequently, the application view can use recover logic to query the other members for responses that match the durable client identifier once the client application restarts.

An application view message listener 106 instance, created when the application view instance 102 was instantiated, can receive the asynchronous service response message as a JMS ObjectMessage, and can pass the message to the asynchronous service response listener 104 supplied in the "invokeServiceAsync" call.

Figure 2:
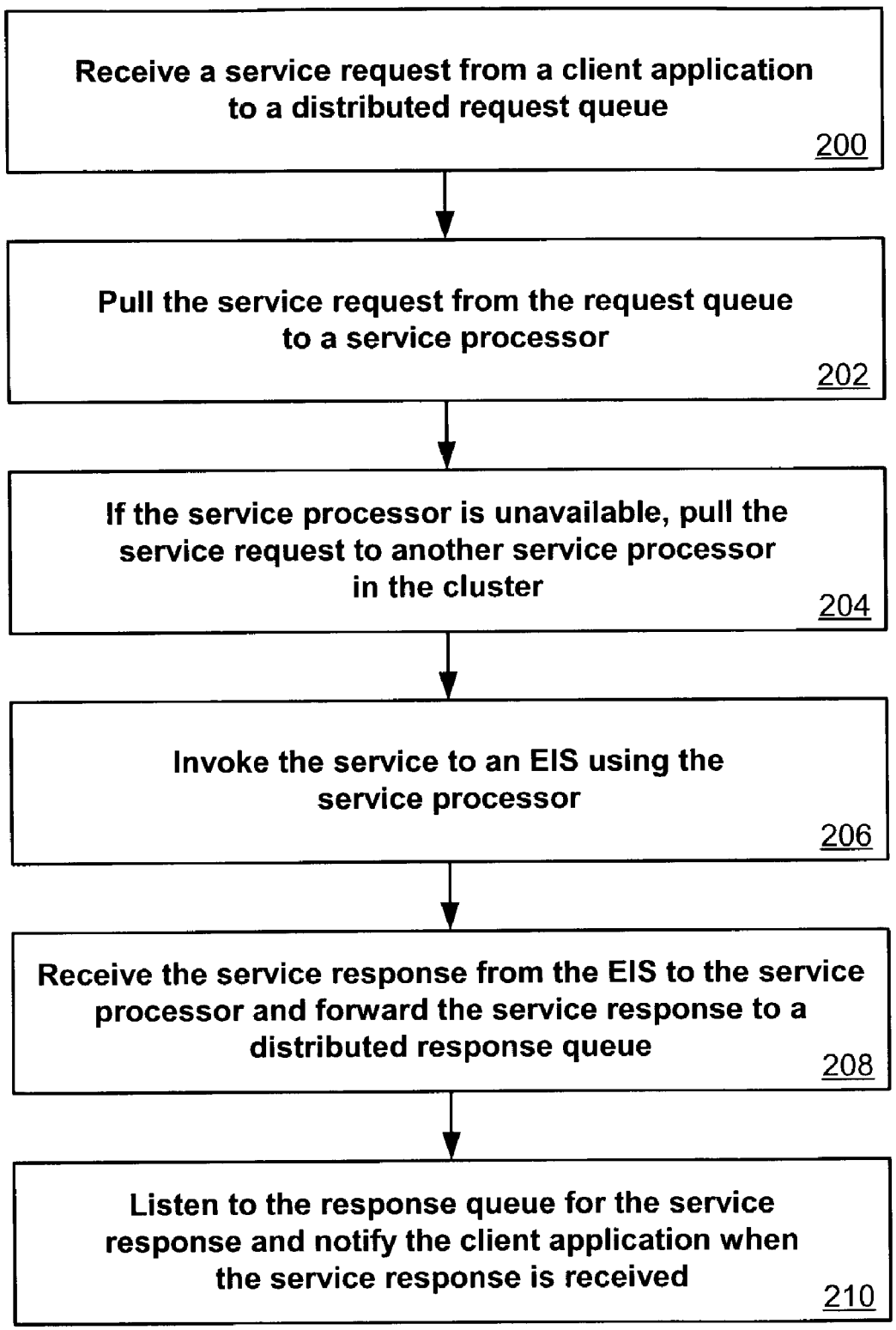
FIG. 2 is flowchart for a method that can be used with the system of FIG. 1.

FIG. 2 shows the steps of a method that can be used with the system of FIG. 1. First, a service request is received to a distributed request queue from a client application 200. The service request is pulled from the request queue to a service processor 202. If the service processor is down, another service processor in the cluster pulls the service request 204. A service is invoked for the service request, such as to an EIS 206. The service response is retrieved by the service processor and forwarded to a distributed response queue for storage until retrieval from a client application 208. A response listener listens to the response queue and notifies the client application when the service response is received 210.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for high-availability processing of asynchronous requests in a single transaction, comprising:
a client application that instantiates an application view instance and passes a durable client identifier to the application view instance, said application view instance configured to create a service request;
an asynchronous request queue distributed over a server cluster and configured for receiving said service request from the application view instance and for storing said service request in a single physical request queue;
a service processor distributed over the server cluster and for pulling the service request from the single physical request queue and for invoking a service for the service request wherein the service processor is further configured for receiving a service response for the service request from the invoked service; and
an asynchronous response queue distributed over the server cluster and configured for receiving the service response from the service processor and for storing the service response in a single physical response queue;
wherein said client application is configured to query the asynchronous response queue distributed over the server cluster for responses that match the durable client identifier in an event of failure and restart of said client application.

2. A system according to claim 1, further comprising:
an enterprise information system containing the service invoked by the service processor.

3. A system according to claim 1, wherein:
said service processor is packaged as a message-driven Enterprise JavaBean.

4. A system according to claim 1, wherein:
the application view client is configured for sending the service request to the distributed request queue and retrieving the service response from the distributed response queue on behalf of the client application.

5. A system according to claim 4, wherein:
said application view client can generate failure recovery semantics for the client application.

6. A system according to claim 1, wherein:
the asynchronous response queue is configured to store the service response until the response is retrieved by the application view client.

7. A system according to claim 1, wherein:
said application view is configured to determine whether any service responses are waiting in the asynchronous response queue for the client application.

8. A system according to claim 1, wherein:
the client identifier is configured for identifying the client application and used to process the service request and service response for the client application.

9. A system according to claim 1, wherein:
said application view client passes the service request to the asynchronous request queue in a request document.

10. A system according to claim 9, wherein:
said application view further passes a service response listener with the request document, the service response listener configured to listen for the service response corresponding to the service request document.

11. A system according to claim 1, wherein:
said service processor is deployed on a node in a cluster.

12. A system according to claim 11, further comprising:
additional service processors, each additional service processor deployed on different node in the cluster.

13. A system according to claim 12, wherein:
the additional service processors are configured to listen to the asynchronous request queue for a service request, each of the additional service processors capable of pulling the service request from the asynchronous request queue and invoking the service for the service request if the service processor is unavailable.

14. A system according to claim 1, wherein:
said service processor further encapsulates the service response into a service response object that is sent to the asynchronous response queue.

15. A method for high-availability processing of asynchronous requests in a single transaction, comprising:
instantiating an application view client by an application and passing a durable client identifier to the application view client, said application view client configured to create a service request maintaining an asynchronous request queue distributed over a server cluster for storing service requests from client applications;

maintaining an asynchronous response queue distributed over the server cluster for storing service responses from invoked services;

maintaining a service processor distributed over the server cluster for servicing service invocations;

receiving a service request to the request queue from the application;

pulling the service request from the asynchronous request queue to a service processor and invoking a service for the service request;

receiving the service response from the invoked service to the asynchronous response queue and storing the service response until retrieval by the application; and querying the asynchronous response queue distributed over the server cluster for responses that match the durable client identifier in an event of failure and restart of said client application.

16. A method according to claim 15, further comprising:
executing the invoked service using an enterprise information system.

17. A method according to claim 15, further comprising:
deploying an additional service processor on each node of the duster containing the service processor.

18. A method according to claim 17, further comprising:
listening to the asynchronous request queue using with the service processor and any additional service processors.

19. A method according to claim 15, further comprising:
packaging the service processor as a message-driven Enterprise JavaBean.

20. A method according to claim 15, wherein:
the application view client is configured to send service requests and receive service responses on behalf of the client application.

21. A method according to claim 20, further comprising:
generating failure recovery semantics using the application view client.

22. A method according to claim 15, wherein:
the durable client identifier is assigned to the service request to be used in processing the service request and service response.

23. A method according to claim 15, wherein:
the step of receiving a service request includes passing a request document and response listener to the service processor.

24. A system for high-availability processing of asynchronous requests in a single transaction, comprising:
an asynchronous request queue distributed over a server cluster and configured for receiving and storing a service request;
an application view client for sending the service request to the request queue on behalf of a client application;
a service processor distributed over the server duster and configured for pulling the service request from the request queue and invoking the service for the service request, the service processor further receiving a service response for the service request from the invoked service; and
an asynchronous response queue distributed over the server cluster and configured for receiving the service response from the service processor and storing the service response until the service response is retrieved for the client application by the application view client.

25. A system for high-availability processing of asynchronous requests in a single transaction, comprising:
an application view client for generating a service request on behalf of a client application, the service request comprising a request document and a service response listener;
a request queue distributed over a server cluster and configured for receiving the service request from the application view client and storing the service request;
a service processor distributed over the server cluster and configured for pulling the service request from the request queue and invoking the service specified in the request document, the service processor further receiving a service response for the request document from the invoked service; and
a response queue distributed over the server cluster and configured for receiving the service response from the service processor and storing the service response until the service response is retrieved for the client application by the application view client, the response listener notifying the application view client when the service response is received in the distributed response queue.

26. A system for high-availability processing of asynchronous requests in a single transaction, comprising:
means for maintaining an asynchronous request queue distributed over a server cluster for storing service requests from client applications;
means for maintaining an asynchronous response queue distributed over the server cluster for storing service responses from invoked services;
means for maintaining a service processor distributed over the server duster for servicing service invocations;
means for receiving a service request to the request queue from a client application;
means for pulling the service request from the request queue to a service processor and invoking a service for the service request; and
means for receiving the service response from the invoked service to the response queue and storing the service response until retrieval from a client application.

27. A computer system for high-availability processing of asynchronous requests in a single transaction comprising: a processor a computer readable medium, and, object code executed by said processor, and embodied on said computer readable medium said object code configured to:
maintain an asynchronous request queue distributed over a server cluster for storing service requests from client applications;
maintain an asynchronous response queue distributed over the server cluster for storing service responses from invoked services;
maintain a service processor distributed over the server cluster for servicing service invocations;
receive a service request to the request queue from a client application;
pull the service request from the request queue to a service processor and invoke a service for the service request; and
receive the service response from the invoked service to the response queue and store the service response until retrieval from a client application.

* * * * *